(12) United States Patent
Stelle, IV et al.

(10) Patent No.: US 12,556,292 B2
(45) Date of Patent: Feb. 17, 2026

(54) TRACKING EXTRA-VEHICULAR TECHNICIAN PROGRESS IN A NETWORK MONITORING SYSTEM

(71) Applicant: Viavi Solutions, Inc., Chandler, AZ (US)

(72) Inventors: Raleigh B. Stelle, IV, Indianapolis, IN (US); Scott Lank, Indianapolis, IN (US)

(73) Assignee: Viavi Solutions, Inc., Chandler, AZ (US)

( * ) Notice: Subject to any disclaimer, the term of this patent is extended or adjusted under 35 U.S.C. 154(b) by 473 days.

(21) Appl. No.: 18/315,942

(22) Filed: May 11, 2023

(65) Prior Publication Data

US 2024/0380499 A1 Nov. 14, 2024

(51) Int. Cl.
*H04B 17/29* (2015.01)
*G06Q 10/0631* (2023.01)

(52) U.S. Cl.
CPC ... *H04B 17/294* (2023.05); *G06Q 10/063114* (2013.01)

(58) Field of Classification Search
CPC .................. H04B 17/294; G06Q 10/063114
USPC ....................................................... 455/67.11
See application file for complete search history.

(56) References Cited

U.S. PATENT DOCUMENTS

| | | | | |
|---|---|---|---|---|
| 2004/0210938 A1* | 10/2004 | Eckenroth | ............... | H04N 17/02 348/192 |
| 2008/0133308 A1* | 6/2008 | Harris | ................... | H04N 17/00 342/357.29 |
| 2011/0226057 A1* | 9/2011 | Nishizawa | ......... | G01C 19/5642 73/504.12 |
| 2013/0283910 A1* | 10/2013 | Nishizawa | ............ | G01C 19/56 310/365 |
| 2013/0312519 A1* | 11/2013 | Ichikawa | ........... | G01C 19/5607 29/25.35 |
| 2014/0330511 A1* | 11/2014 | Tison | .................... | G06T 19/006 701/428 |
| 2021/0132133 A1* | 5/2021 | Wolcott | .............. | G01R 31/086 |
| 2022/0359068 A1* | 11/2022 | Abdulkarim | ........... | G16H 10/40 |
| 2024/0410942 A1* | 12/2024 | Ruengeler | ............. | H04B 17/21 |

* cited by examiner

*Primary Examiner* — April G Gonzales
(74) *Attorney, Agent, or Firm* — DLA PIPER LLP US

(57) ABSTRACT

A technician's progress may be tracked using a location data from a mobile device being carried by the technician. For instance, when the technician undocks a test instrument, such as a handheld meter for measuring leakage signal, the mobile device may be triggered to track and transmit its locations. Therefore, the test instrument-mobile device combination may continuously generate two pieces of information-leakage signal measurement from the test instrument and the location from the mobile device. Both the test instrument and the mobile device may transmit the corresponding pieces of information to a remote server, which may associate the leakage signal measurements and locations. The present system may have a visibility of the location of the technician and the corresponding leakage signal measurement when the technician is outside the vehicle, compared to the conventional systems that are generally blind in these situations.

20 Claims, 7 Drawing Sheets

TRACKING EXTRA-VEHICULAR TECHNICIAN PROGRESS IN A NETWORK MONITORING SYSTEM

BACKGROUND

Networks form a vital part of the modern economy. For example, there are cable networks that support broadband Internet, cable television, and telephone lines. Furthermore, there are other types of networks such as 5G, passive optical network (PON), direct subscriber line (DSL), Transport network, etc. All of these networks support different types of communications in the modern information technology highway. It is therefore critical that these networks are adequately maintained, tested, and/or otherwise kept in good working order for the modern economy and modern lives to function.

One of the main issues in these networks, e.g., cable network system, is egress (also known as signal leakage). Signal leakage generates undesirable wireless transmissions around the vicinity of cables and or components connected to the cables. Such leakage may introduce noise into the desirable signal being transmitted through the cables, where the noise may be caused by, for example, weakening of the signal due to the leakage. Furthermore, the leakage may cause an ingress point, where other undesired signals may enter into the cables and cause more noise.

Conventional signal leakage monitoring/diagnostics has thus far been limited to vehicle mounted systems. This works well on average and meets the minimum plant monitoring requirements. However, there are many situations when the vehicle cannot get close enough to the source of a problem, requiring the technician to get out of the vehicle and attempt to isolate the problem on foot. For instance, the source of the leak may not be close to a road or a vehicle accessible area, necessarily requiring the technicians foot movements and path taken to detect the leakage source.

Vehicle mounted systems, however, cannot track the technician's progress once the technician leaves the vehicle to troubleshoot or isolate the leakage source. In other words, conventional systems are essentially blind when the technician leaves the vehicle. For example, these systems cannot determine if the technician left the vehicle and actually tried to track the issue, or just turned off his equipment and sat on the curb instead.

Accordingly, there is a need and desire for a test mechanism that tracks the technician's progress when the technician leaves the vehicle, particularly when he/she is supposed to be troubleshooting leakage.

SUMMARY

Embodiments disclosed herein solve the aforementioned technical problems and may provide other technical solutions as well. In one or more embodiments, the technician's progress may be tracked using location data from a mobile device being carried by the technician. For instance, when the technician undocks a test instrument, such as a handheld meter for measuring a leakage signal, from a vehicle's equipment, the mobile device may be triggered to track and transmit its locations. Therefore, the test instrument-mobile device combination may continuously generate two pieces of information—leakage signal measurements from the test instrument and the location from the mobile device. Both the test instrument and the mobile device may transmit the corresponding pieces of information to a remote server, which may associate the leakage signal measurements and locations. The present system therefore has visibility of the location of the technician and the corresponding leakage signal measurements when the technician is outside the vehicle, which is a benefit not previously achievable by the conventional systems that are generally blind in these situations.

In an embodiment, a computer-implemented method is provided. The method may be performed by a processor on a server and comprises detecting a walkout mode of a test instrument when the test instrument is undocked from a vehicle's equipment to allow a technician to perform leakage signal measurements outside the vehicle and receiving a first data stream of location information from a mobile device associated with the technician. The method may further comprise receiving a first data stream of location information from a mobile device associated with the technician and receiving a second data stream of the leakage signal measurements from the test instrument carried by the technician. The method may also comprise associating the location information from the mobile device and the leakage signal measurements from the test instrument, thereby tracking the technician's progress outside the vehicle.

In another embodiment, computer-implemented method is provided. The method may be performed by a processor on a mobile device and comprises determining that a test instrument has been disconnected from a vehicle's equipment and tracking locations as the test instrument moves around a vicinity of the vehicle. The method may also comprise transmitting the tracked locations to a remote server such that the server can correlate leakage signal measurements from the test instrument with the tracked locations to track a technician's progress outside the vehicle.

In yet another embodiment, a system is provided. The system may comprise a non-transitory storage medium storing computer program instructions and one or more processors configured to execute the computer program instructions to cause the system to perform operations. The operations may comprise detecting a walkout mode of a test instrument when the test instrument is undocked from a vehicle's equipment to allow a technician to perform leakage signal measurements outside the vehicle and receiving a first data stream of location information from a mobile device associated with the technician. The operations may further comprise receiving a first data stream of location information from a mobile device associated with the technician and receiving a second data stream of the leakage signal measurements from the test instrument carried by the technician. The operations may also comprise associating the location information from the mobile device and the leakage signal measurements from the test instrument, thereby tracking the technician's progress outside the vehicle.

DETAILED DESCRIPTION

In the context of signal leakage detection and measurement in cable network systems, situations will arise when vehicle mounted equipment is insufficient and a technician will have to step out of the vehicle to investigate and detect/troubleshoot signal leaks. The technician generally carries a test instrument—a handheld device that remains docked to the vehicle mounted equipment—to measure the leakage signal as the technician walks around. Unlike conventional systems that generally go blind as soon as the technician steps outside of the vehicle, embodiments disclosed herein continuously track the location of the technician once outside of the vehicle. In one or more embodiments, the location of the technician is tracked based on location of a mobile device (e.g., a smartphone) being carried by the technician.

Therefore, as the technician performs the investigative and diagnostic operations outside the vehicle, the test instrument may generate the leakage signal measurement while the mobile device may generate location information. Both the leakage signal measurement and the location information may be provided to a remote server, which may associate the measurements and the locations thereby generating a fuller picture of the technician's progress outside of the vehicle. The technician's progress outside the vehicle may be tracked in real-time or near real-time by supervisors as a quality control mechanism.

Figure 1:
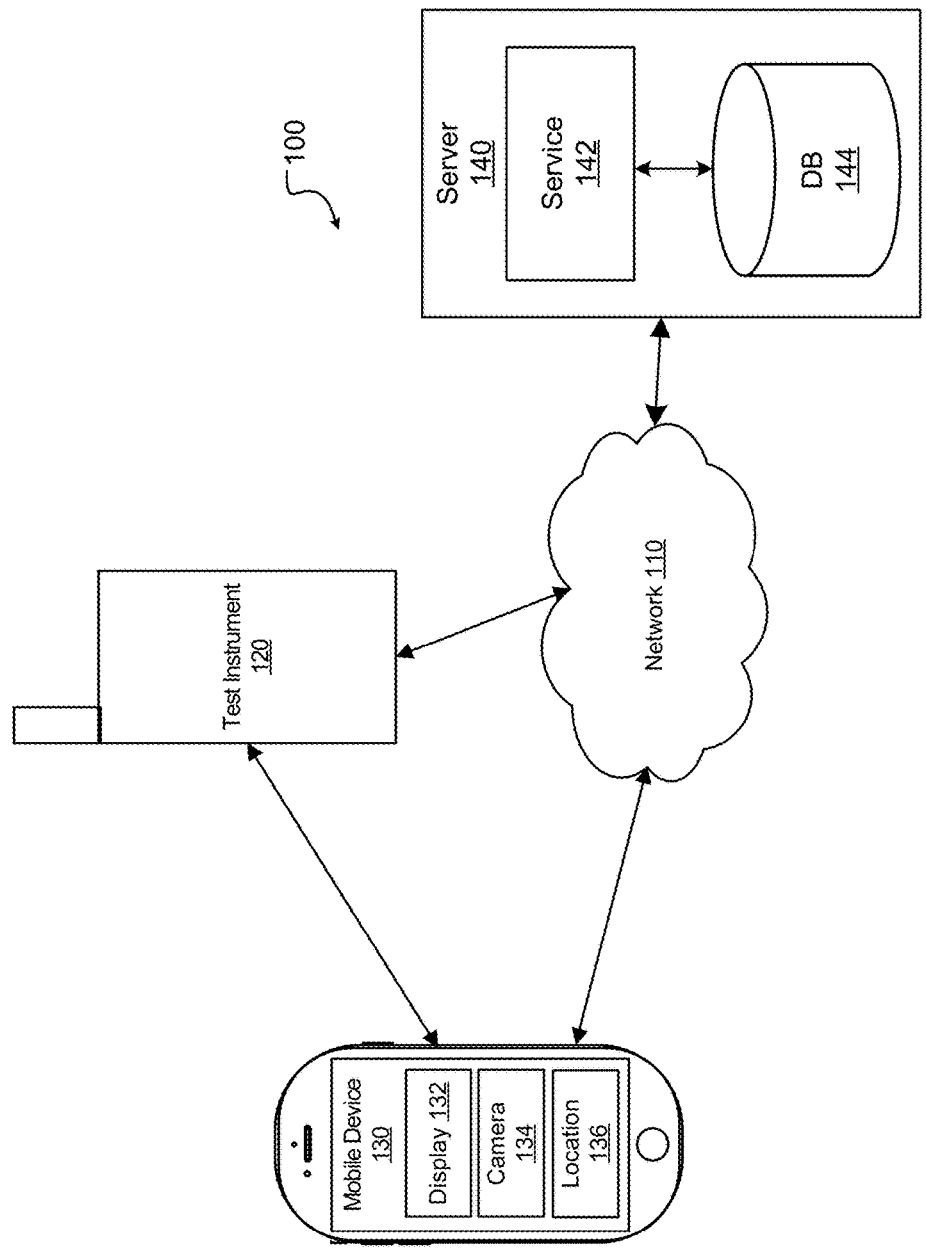
FIG. 1 illustrates a test system based on the principles disclosed herein.

FIG. 1 illustrates a test system 100 based on the principles disclosed herein. In the illustrated example, the system 100 includes a test instrument 120, mobile device 130, and a server 140. The test instrument 120 and mobile device 130 may communicate with the server 140 via a network 110 or cloud-based environment, which in the illustrated example may be the Internet. In one or more embodiments, the mobile device 130 will be paired to and communicate directly with the test instrument 120 via a Bluetooth or Bluetooth Low Energy (BLE) connection. It should, however, be understood that these components and communication protocols are identified as examples and should not be considered limiting. Therefore, systems with additional and/or alternate components and/or protocols are to be considered within the scope of this disclosure. For example, the network 110 may be any combination of packet switching or circuit switching networks, and the connection between the mobile device 130m and the test instrument 120 may be through protocols such as Zigbee or WiFi.

In one or more embodiments, the test instrument 120 is a leakage detector that may be mounted in a vehicle (e.g., to a vehicle equipment) for an "in-vehicle" mode of operation and also removable (i.e., undocked) from the vehicle mount for a "walkout" mode of operation in which the technician troubleshoots on foot. An example of such a test instrument is an instrument from the Seeker family of leakage detectors manufactured and sold by VIAVI Solutions Inc., including the Seeker X and Seeker D with MCA III, which is modified to include the processing and features disclosed herein. As disclosed herein, the test instrument 120 monitors for and detects egress/leakage signals and generates data that is sent to the server 140 for processing, analysis, and troubleshooting, among other things. When mounted in a vehicle, the test instrument 120 may include position information such as GPS information that is correlated to the egress/leakage signal data. The test instrument 120 transmits the data to the server 140 via the network 110 and receives e.g., processed/analyzed data for updating a display on the instrument 120 to help the technician locate the leak or leaks.

In the illustrated system 100, the mobile device 130 includes at least a display 132, which may be a touchscreen such as those used in smartphones and tablets, camera 134, and a location system 136 (e.g., GNSS). Additional details of a computing device that be used as the mobile device 130 are discussed below with reference to FIG. 6. In one or more embodiments, the mobile device 130 will be paired to and communicate directly with the test instrument 120 via, for example, a Bluetooth or BLE connection. It should be appreciated that other wireless or wired connections could be used.

As discussed below with respect to FIG. 2, the mobile device 130 will execute an application configured to work with the test instrument 120 during the "walkout" mode of operation. In one embodiment, the application is a technician productivity application offered by VIAVI Solutions Inc., including the Mobile Tech Application, which is modified to include the processing and features disclosed herein. For example, during the "walkout" mode, the mobile device 130 (via the application or other programmed instructions) will serve as a location detector, e.g., through the location system 136. Therefore, while the test instrument 120 measures the signal leakage, the mobile device 130 may determine the position of the leakage. In one or more embodiments, the location system 136 may be operate by processing signals from a constellation of global navigation satellite system (GNSS) satellites.

In the illustrated system 100, the server 140 includes a service 142 and a non-transitory memory storing a database 144. Additional details of a computing device that may serve as the server 140 are discussed below with reference to FIG. 6. The service 142 is configured to work with the test instrument 120 and mobile device 130 to facilitate egress monitoring and detection and identify the possible location/locations of the egress source. In one embodiment, the service is a leakage analysis service offered by VIAVI Solutions Inc., including the Leakage Analysis Workshop (LAW) service, which is modified to include the processing and features disclosed herein. The database 144 is used to store and retrieve data that may be analyzed to detect the location or locations of the egress/leakage. In addition, the database 144 may be used to store and retrieve data that can be used to track the technician's progress outside the vehicle.

Figure 2:
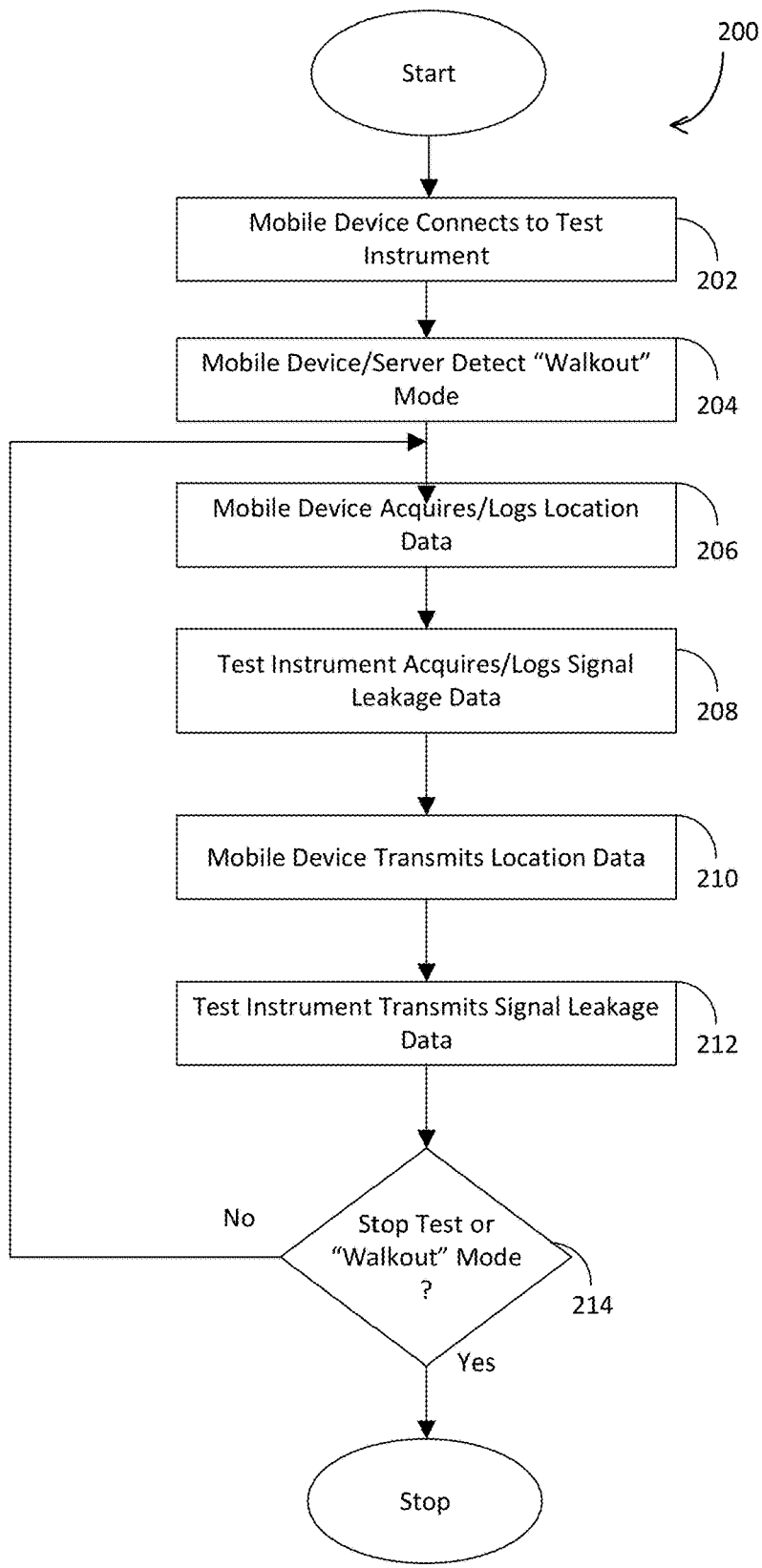
FIG. 2 illustrates example method of tracking extra-vehicular progress of a technician, based on the principles disclosed herein.

FIG. 2 illustrates example method 200 of tracking extravehicular progress of a technician, based on the principles disclosed herein. In one or more embodiments, the method 200 may be implemented by the mobile device 130 and the test instrument 120. For example, the method 200 may be implemented via computer executable instructions stored in a non-transitory memory of the mobile device 130 that are executed by the device's processor. In one or more embodiments, the computer executable instructions are part of the Mobile Tech application (discussed above) that has been modified to include the disclosed processing. Additionally, the method 200 may be implemented by a processor of the test instrument 120 when the test instrument 120 is connected to the mobile device 130. Furthermore, a portion of the method 200 may be performed by the server 140.

Therefore, the method 200 should be understood to have been performed by any portion of the FIG. 1 system 100.

The method 200 may be activated by a user upon activation of a hardware or software control (e.g., selecting and or double clicking on an icon associated with the method 200 or Mobile Tech application) or it may be automatically executed as part of a startup process of the mobile device 130. Regardless of how the method 200 is activated, the method 200 begins at step 202 when the mobile device 130 is paired to and or connected to the test instrument 120. As noted above, in one or more embodiments, the mobile device 130 will be paired to and or connected to the test instrument 120 via a Bluetooth or BLE connection. Step 202 can be performed automatically upon the activation of the method 200 or upon detection of the test instrument 120, among other options. In addition, or alternatively, step 202 may be performed as a manual process whereby the user is prompted to initiate and or confirm the pairing operation.

At step 204, the mobile device's processor will detect that the test instrument 120 has entered the "walkout" mode. For example, when the test instrument 120 is removed from the vehicle mount, the instrument 120 can send a signal or message to the mobile device 130 indicating that the "walkout" mode is now the current operating mode of the instrument 120. In one or more embodiments, this step could occur automatically once the mobile device 130 is connected to or paired with the test instrument 120 or it can be performed manually by the technician by selecting an option on either the test instrument 120 or mobile device 130. In one or more embodiments, the server 140 may detect the walkout mode and indicate the detection to the mobile device 130.

During the "walkout" mode, the processor of the mobile device 130 acquires the position/location of the mobile device (corresponding to the position of the technician). The position data may be retrieved from the mobile device's positioning system 136. That is, the mobile device 130 may continuously track the position of the technician as the technician moves about outside of the vehicle.

At step 208, the test instrument 120 acquires/logs signal leakage data. For example, the test instrument 120 may continuously measure the signal level from a detected leakage signal. Therefore, as the technician moves about with the test instrument 120, the test instrument 120 measures the attributes of the signal to indicate whether the strength of the signal is increasing or decreasing. This measurement may be continuously displayed on the display of the test instrument such that the technician may assess and ascertain whether he or she is moving closer or away from a leakage source.

At step 210, the mobile device 130 transmits location data to the server 140. For example, the location data may form a first data stream from the mobile device 130 to the server 140. Using this first data stream, the server 140 may have a continuous "view" of the technician as the technician performs the testing operation outside the vehicle on Foot.

At step 212, the test instrument 120 transmit the signal leakage data to the server 140. The signal leakage data may form a second data stream from the test instrument 120 to the server 140. Using the second data stream, the server 140 may not only have a view of the location of the technician, but also the technician's actual measurement of the leakage signal strength at the corresponding locations.

At step 214, a determination is performed as to whether the test or the "walkout" mode has ended. For example, the mobile device's processor determines whether the technician has stopped his/her leakage signal test and or if the test instrument 120 has exited the "walkout" mode (and has entered the "in-vehicle" mode). Alternatively, the server 140 determines that the "walkout" has ended based on receiving one or more signals from the mobile device 130 and or the test instrument 120. For instance, the server 140 may determine that the "walkout" mode has ended if there has been no signal detection activity for a predetermined amount of time. If it is determined that the technician has stopped testing or if the test instrument 120 has exited the "walkout" mode (i.e., a yes at step 214), the method 200 terminates. However, if it is determined that the technician has not stopped testing and that the test instrument 120 has not exited the "walkout" mode (i.e., a no at step 214), the method 200 continues at step 206 where more location and leakage signals are logged (as discussed above).

Figure 4A:
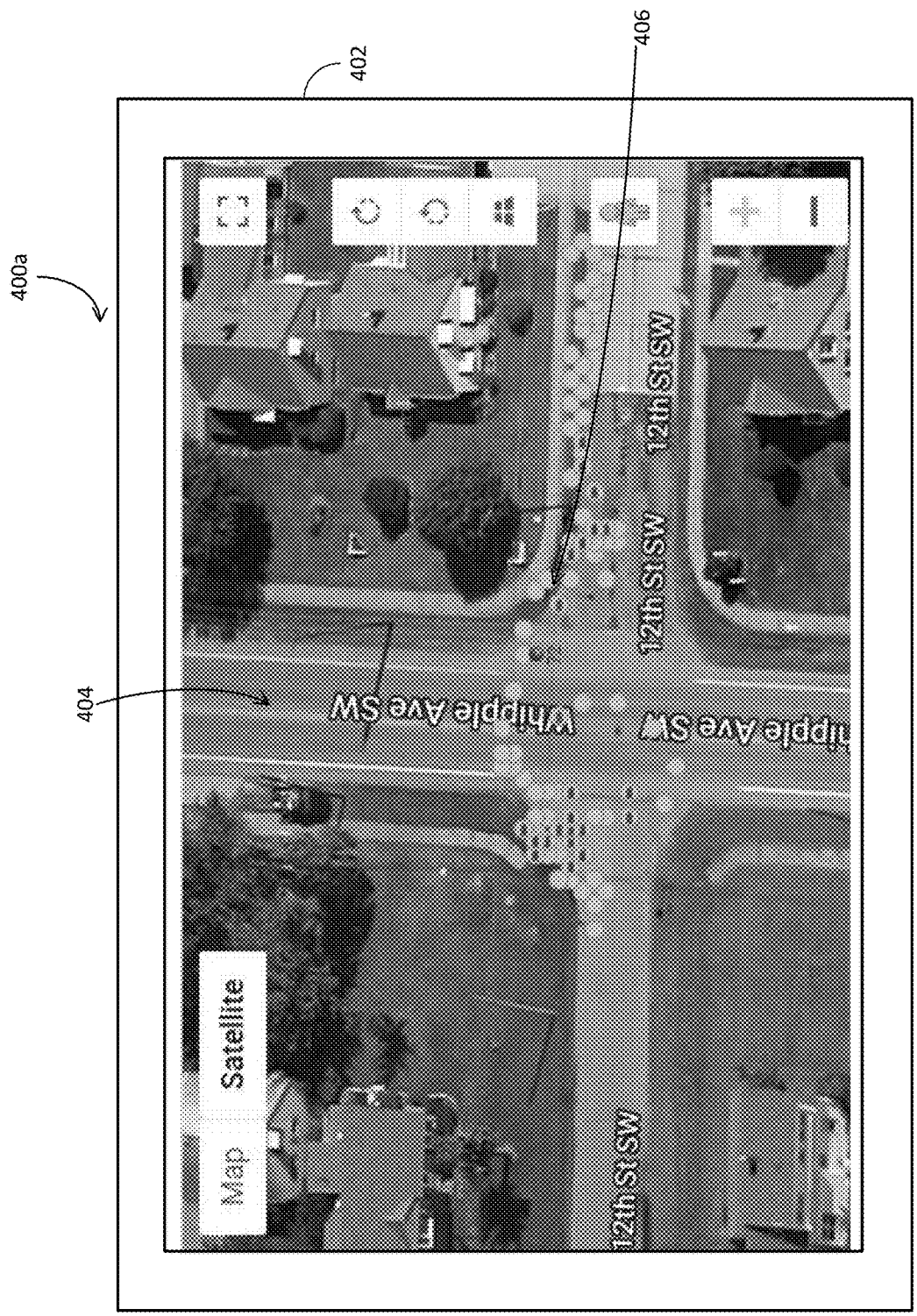
FIGS. 4A-4B show example GUIs generated by the server to display the technician's extra-vehicular progress, based on the principles disclosed herein.
Figure 4B:
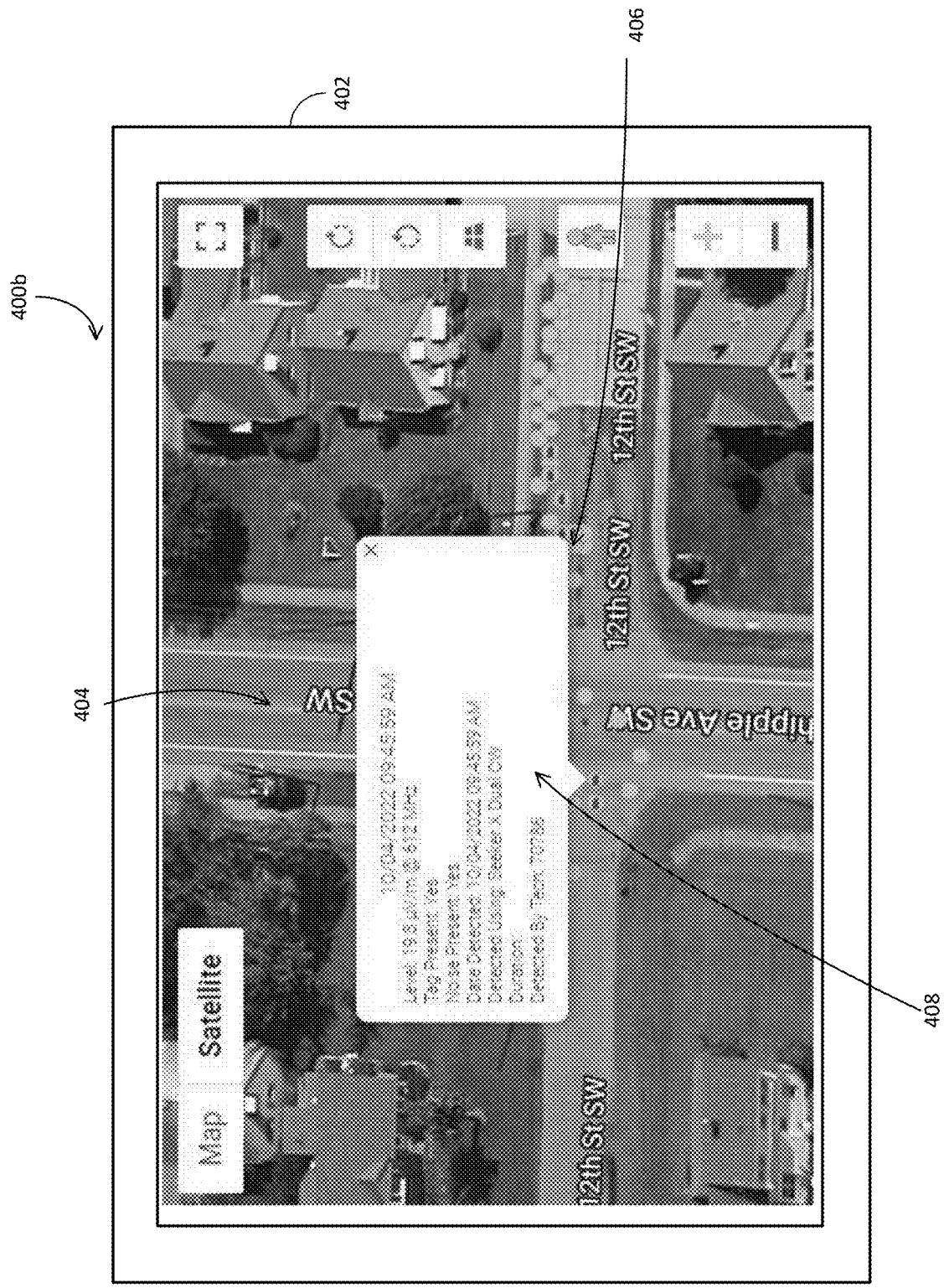

Therefore, at the end of the method 200, the server 140 will have a complete view of the technician's extra-vehicular activity. For example, the server 140 may associate the first data stream (i.e., the location data) and the second data stream (i.e., the signal leakage data). This association may allow the server 140 to generate an interface (e.g., as shown in FIGS. 4A-4B discussed below) showing the extra vehicular activity of the technician. For instance, the corresponding signal strengths at multiple locations may be shown. Example operations at the server 140 are detailed below.

Additionally, the mobile device 130 and the test instrument 120 may communicate with each other through a local connection (e.g., a Bluetooth or BLE connection as described above). Using this location connection, the test instrument 120 may transmit leakage signal measurements to the mobile device 130 as well. In turn, the mobile device 130 may rendered the received leakage signal measurements on its display 132. An example GUI on the display 132 is described in reference to FIG. 5 below.

Figure 3:
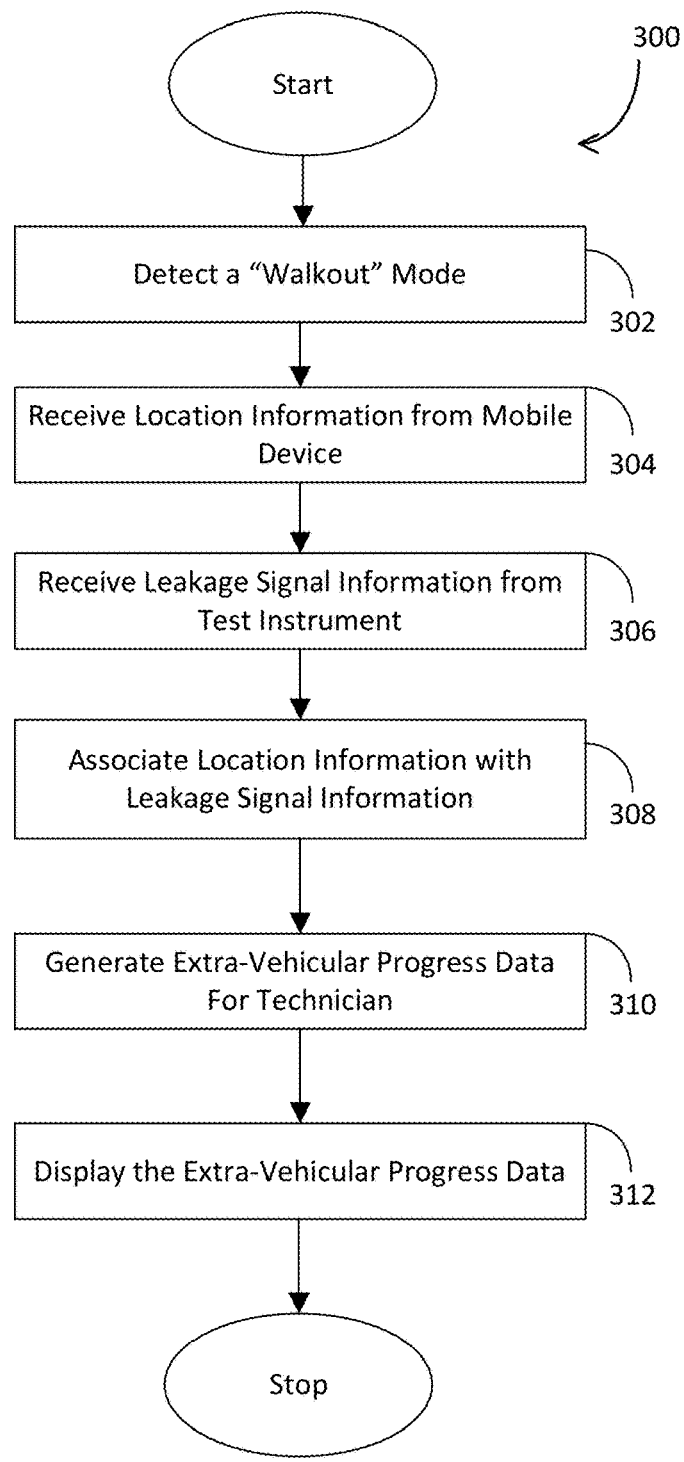
FIG. 3 illustrates example method performed by the server illustrated in FIG. 1, based on the principles disclosed herein.

FIG. 3 illustrates example method 300 performed by the server 140 illustrated in FIG. 1, based on the principles disclosed herein. In one or more embodiments, the method 300 is implemented via computer executable instructions stored in a non-transitory memory of the server 140 that are executed by the server's processor. In one or more embodiments, the computer executable instructions are part of the service 142 (e.g., LAW service discussed above) performed by the server 140, which has been modified to include the disclosed processing.

At step 302, the server 140 detects a "walkout" mode. For example, the server 140 may receive a signal from the test instrument 120 indicating that the test instrument has been undocked from vehicle equipment (e.g., a docking station). Alternatively, the server 140 may receive a signal from the vehicle's equipment that the test instrument 120 has been undocked. In other embodiments, the server 140 may receive a signal from the mobile device 130 indicating that the "walkout" mode has been initiated based on the undocking of the test instrument 120 from the vehicle's equipment. In one more of these signals or the data, the server 140 may detect the "walkout" mode responsive to receiving a "walkout" tag. The "walkout" tag may be received by the server 140 from one or more of the test instrument 120, mobile device 130, or the vehicle's equipment.

At step 304, the server 140 receives location information from the mobile device 130. The location information may be transmitted by the mobile device 130 by executing step 210 of the method 200 described above. The location information may form a first data stream of information received by the server 140.

At step 306, the server receives leakage signal information from the test instrument 120. The leakage signal information may be provided by the test instrument 120 by executing step 212 of method 200 described above. The leakage signal information may form a second data stream of information received by the server 140. Particularly, the leakage signal information may include the signal strength measurement of the leakage signal.

At step 308, the server 140 associates the location information with leakage signal information. Such associating may include, for example, generating a one-to-one correspondence between the location information and the leakage signal information. For instance, both the location information and the leakage signal information may include timestamps, and these timestamps may be used for the association. In one or more embodiments, the mobile device 130 also may receive the leakage signal information and geotag the received information. The server 140 may use this geotagging for the association. Therefore, any type of technique to associate the leakage signal information with the location information should be considered within the scope of this disclosure.

At step 310, the server 140 generates extra-vehicular progress data for the technician. The extra vehicular progress data may include a correlation between the location information and the leakage signal information at different timestamps. This correlation will allow the server to faithfully log and analyze the technician's activities, unlike the conventional systems that go blind when the technician exits the vehicle.

At step 312, the server displays the extra-vehicular progress data. For instance, the server 140 may superimpose the extra-vehicular progress data on a map, where multiple locations and corresponding leakage signal information are shown. The server 140 may further use the extra-vehicular progress data to generate an activity report for the technician.

The extra-vehicular progress data may be generated (step 310) and displayed (step 312) in real-time or near real-time. This embodiment may allow a tracking of technician's progress in real-time or near real-time by supervisors. The real-time or near real-time tracking by the supervisors may be used for a quality control mechanism.

FIGS. 4A-4B show example GUIs 400a-400b generated by the server 140 to display the technician's extra-vehicular progress, based on the principles disclosed herein. The GUIs 400a-400b may be displayed on a display device 402, e.g., a computer monitor connected to the server 140. As shown in GUI 400a, a map 404 (e.g., a satellite map) may be displayed with the technician's locations 406 superimposed thereon. Alternatively, or additionally, specific leakage signal data associated with the locations 406 may be shown. For example, GUI 400b shows additional data 408 associated with one of the locations 406.

Figure 5:
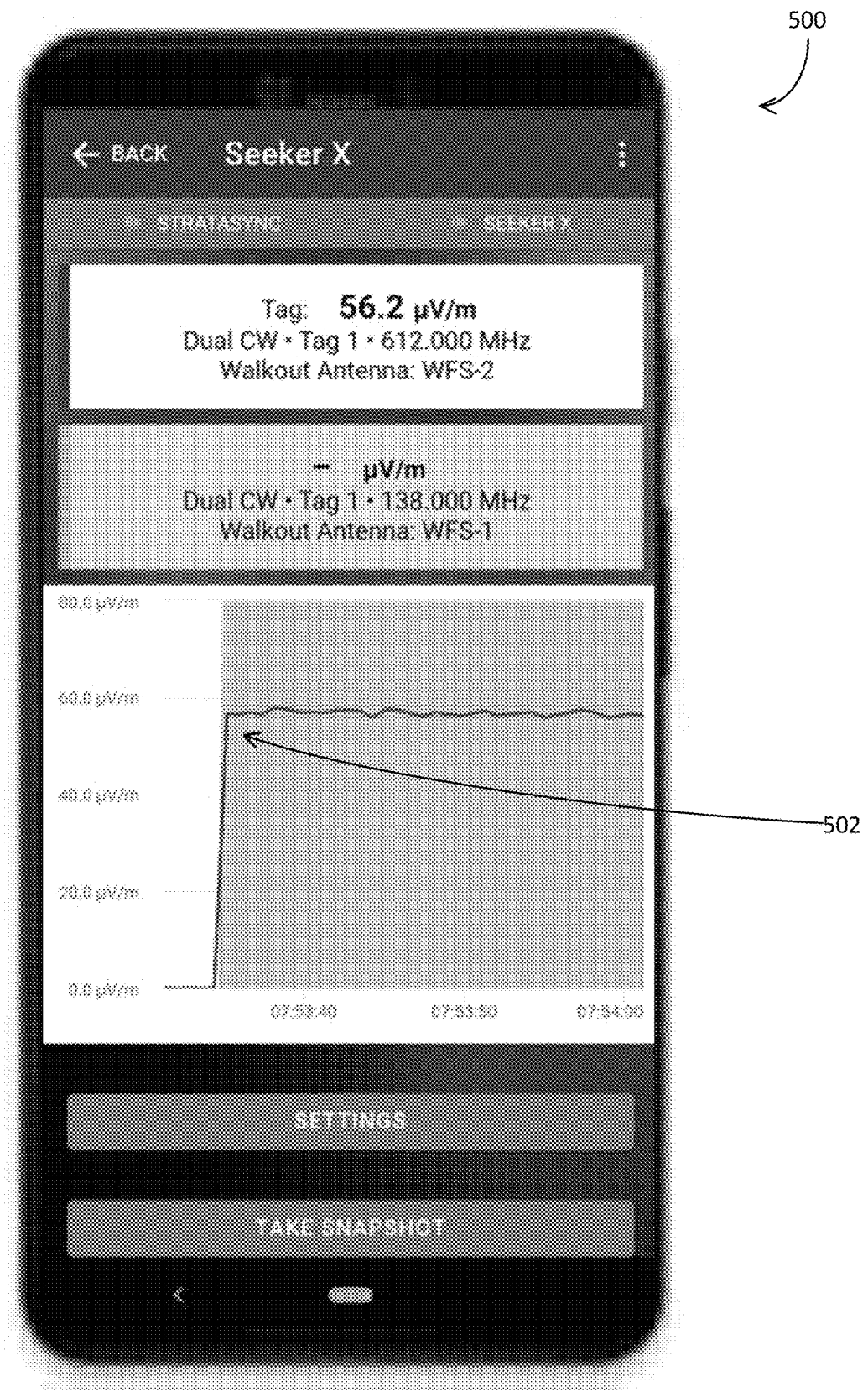
FIG. 5 shows an example GUI generated by the mobile device to show a specific leakage signal measurement, based on the principles disclosed herein.

FIG. 5 shows example GUI 500 generated by the mobile device 130 to show a specific leakage signal measurement, based on the principles disclosed herein. The GUI 500 may be displayed as the technician is measuring the signal leakage outside the vehicle. That is, the test instrument 120 may perform the leakage signal measurement and provide the data to the mobile device 130. Based on the received data, the mobile device 130 may provide a graphical rendering 502 of the signal strength of the leakage signal.

Figure 6:
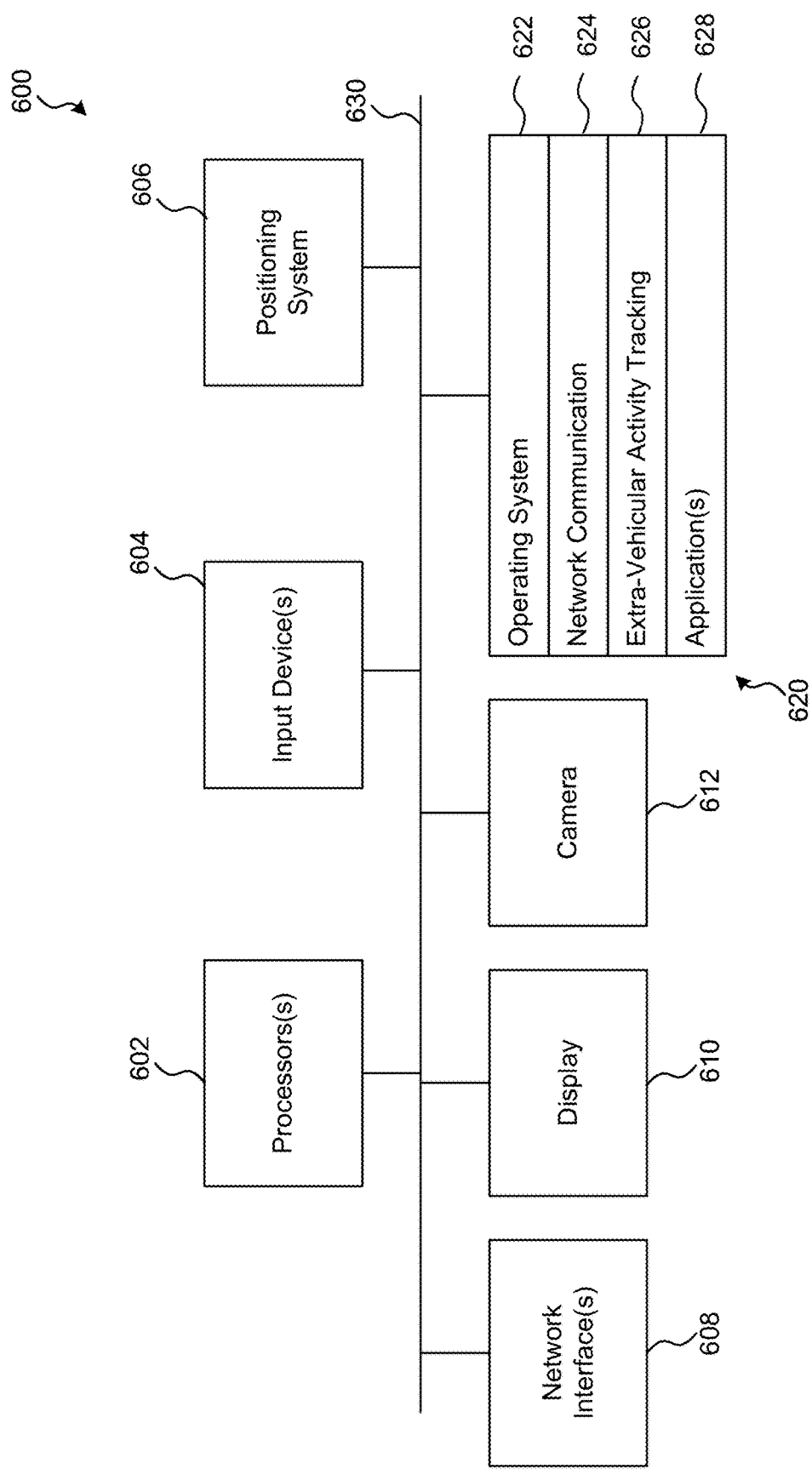
FIG. 6 is a block diagram of an example computing device that may implement various features and processes as described herein.

FIG. 6 is a block diagram of an example computing device 600 that may implement various features and processes as described herein. The computing device 600 may be any electronic device that runs software applications derived from compiled instructions, including without limitation servers, personal computers, smartphones, media players, electronic tablets, email devices, etc. In some implementations, the computing device 600 may include one or more processors 602, one or more input devices 604, one or more display devices 610, one or more network interfaces 608, one or more non-transitory computer-readable media 620. Each of these components may be coupled by a bus 630. Computing device 600 may be used as the server 140 or mobile device 130 of system 100. When the computing device 600 is a smartphone or tablet (e.g., mobile device 130), it may also include a positioning system 606 (e.g., GPS) and or camera 612.

Display device 610 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 630 may be any known internal or external bus technology, including but not limited to ISA, EISA, PCI, PCI Express, USB, Serial ATA or FireWire. Computer-readable medium 620 may be any non-transitory medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 620 may include various instructions 622 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 610; keeping track of files and directories on computer-readable medium 620; controlling peripheral devices (e.g., disk drives, printers, etc.) which can be controlled directly or through an I/O controller; and managing traffic on bus 630. Network communications instructions 624 may establish and maintain network connections (e.g., software for implementing communication protocols, such as TCP/IP, HTTP, Ethernet, telephony, etc.).

Extra-vehicular activity tracking instructions 626 may include instructions that implement the various methods 200, 300 described herein. Application(s) 628 may be an application that uses or implements the processes described herein and/or other processes. The processes may also be implemented in operating system 622.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, said method being performed by a processor on a server and comprising:
    detecting a walkout mode of a test instrument when the test instrument is undocked from a vehicle's equipment to allow a technician to perform leakage signal measurements outside the vehicle;
    receiving a first data stream of location information from a mobile device associated with the technician;
    receiving a second data stream of the leakage signal measurements from the test instrument; and
    associating the location information from the mobile device and the leakage signal measurements from the test instrument, thereby tracking the technician's progress outside the vehicle.

2. The computer-implemented method of claim 1, further comprising:
    generating a graphical user interface (GUI) displaying the technician's progress outside the vehicle.

3. The computer-implemented method of claim 1, further comprising:
    generating a GUI displaying a plurality of extra vehicular locations of the technician superimposed on a map.

4. The method of claim 1, further comprising:
    generating a GUI displaying a plurality of extra vehicular locations and associated signal strength measurement superimposed on a map.

5. The computer-implemented method of claim 1, wherein detecting the walkout mode comprises:
    detecting a walkout tag in a signal received from one or more of the test instrument, the mobile device, or the vehicle equipment.

6. The computer-implemented method of claim 1, wherein the location information is based on a global navigation satellite system (GNSS) based operation performed by the mobile device.

7. The computer-implemented method of claim 1, the tracking of the technician's progress outside the vehicle comprising:
    tracking the technician's progress outside the vehicle in real-time or near-real time.

8. The computer-implemented method of claim 1, further comprising:
    generating an activity report based on the technician's progress outside the vehicle.

9. The computer-implemented method of claim 1, wherein the leakage signal measurements are for a cable network system.

10. A computer-implemented method, said method being performed by a processor on a mobile device and comprising:
    determining that a test instrument has been disconnected from a vehicle's equipment;
    tracking locations as the test instrument moves around a vicinity of the vehicle; and
    transmitting the tracked locations to a remote server such that the server can correlate leakage signal measurements from the test instrument with the tracked locations to track a technician's progress outside the vehicle.

11. The computer-implemented method of claim 10, wherein the tracking of the locations is based on GNSS.

12. The computer-implemented method of claim 10, further comprising:
receiving the leakage signal measurements from the test instrument; and
displaying the received leakage signal measurements on a GUI.

13. The computer-implemented method of claim 12, wherein the received leakage signal measurements comprise signal strength.

14. The computer-implemented method of claim 10, further comprising:
establishing a local communication with the test instrument.

15. A system comprising:
a non-transitory storage medium storing computer program instructions; and
one or more processors configured to execute the computer program instructions to cause the system to perform operations comprising:
detecting a walkout mode of a test instrument when the test instrument is undocked from a vehicle's equipment to allow a technician to perform leakage signal measurements outside the vehicle;
receiving a first data stream of location information from a mobile device associated with the technician;
receiving a second data stream of leakage signal measurement from the test instrument carried by the technician; and
associating the location information from the mobile device and the leakage signal measurements from the test instrument, thereby tracking the technician's progress outside the vehicle.

16. The system of claim 15, the operations further comprising:
generating a graphical user interface (GUI) displaying the technician's progress outside the vehicle.

17. The system of claim 15, the operations further comprising:
generating a GUI displaying a plurality of extra vehicular locations of the technician superimposed on a map.

18. The system of claim 15, the operations further comprising:
generating a GUI displaying a plurality of extra vehicular locations and associated signal strength measurement superimposed on a map.

19. The system of claim 15, the operations further comprising:
generating an activity report based on the technician's progress outside the vehicle.

20. The system of claim 15, the tracking of the technician's progress outside the vehicle comprising:
tracking the technician's progress outside the vehicle in real-time or near-real time.

* * * * *